(12) United States Patent
Souza et al.

(10) Patent No.: US 11,069,364 B1
(45) Date of Patent: Jul. 20, 2021

(54) DEVICE ARBITRATION USING ACOUSTIC CHARACTERISTICS

(71) Applicant: Amazon Technologies, Inc., Seattle, WA (US)

(72) Inventors: Henry Michael D Souza, San Diego, CA (US); Ragini Prasad, Los Altos, CA (US); Rick Carragher, Issaquah, WA (US); Joseph White, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 16/583,699

(22) Filed: Sep. 26, 2019

(51) Int. Cl.
| | |
|---|---|
| *G10L 21/02* | (2013.01) |
| *G06F 3/16* | (2006.01) |
| *H04R 5/04* | (2006.01) |
| *G10L 25/51* | (2013.01) |
| *G10L 21/0316* | (2013.01) |
| *G10L 21/0364* | (2013.01) |

(52) U.S. Cl.
CPC .......... *G10L 21/0202* (2013.01); *G06F 3/167* (2013.01); *G10L 21/02* (2013.01); *G10L 21/0316* (2013.01); *G10L 21/0364* (2013.01); *G10L 25/51* (2013.01); *H04R 5/04* (2013.01); *G10L 2021/03643* (2013.01); *G10L 2021/03646* (2013.01)

(58) Field of Classification Search
CPC . G10L 21/02; G10L 21/0364; G10L 21/0316; G10L 25/51; G10L 2021/03646; G10L 2021/03643; H04R 5/04; G06F 3/167
See application file for complete search history.

(56) References Cited

U.S. PATENT DOCUMENTS

| | | | | |
|---|---|---|---|---|
| 9,304,736 | B1* | 4/2016 | Whiteley | G06Q 20/40145 |
| 10,074,371 | B1* | 9/2018 | Wang | G10L 15/30 |
| 10,600,419 | B1* | 3/2020 | Sarikaya | G10L 15/34 |
| 2016/0180853 | A1* | 6/2016 | VanLund | G10L 17/22 |
| | | | | 704/275 |

* cited by examiner

*Primary Examiner* — Yogeshkumar Patel
(74) *Attorney, Agent, or Firm* — Pierce Atwood LLP

(57) ABSTRACT

Described herein is a system for device arbitration using acoustic characteristics of a physical space, such as a user's household. The system generates a matrix of inter-device attenuation factors. The inter-device attenuation factors are determined using the attenuation experienced by a first device versus the attenuation experienced by a second device. Once the matrix is generated, an attenuation vector representing the attenuation corresponding to an input audio signal is determined and compared to the matrix. Based on the comparison, the system selects a device for further processing.

20 Claims, 10 Drawing Sheets

US 11,069,364 B1

DEVICE ARBITRATION USING ACOUSTIC CHARACTERISTICS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
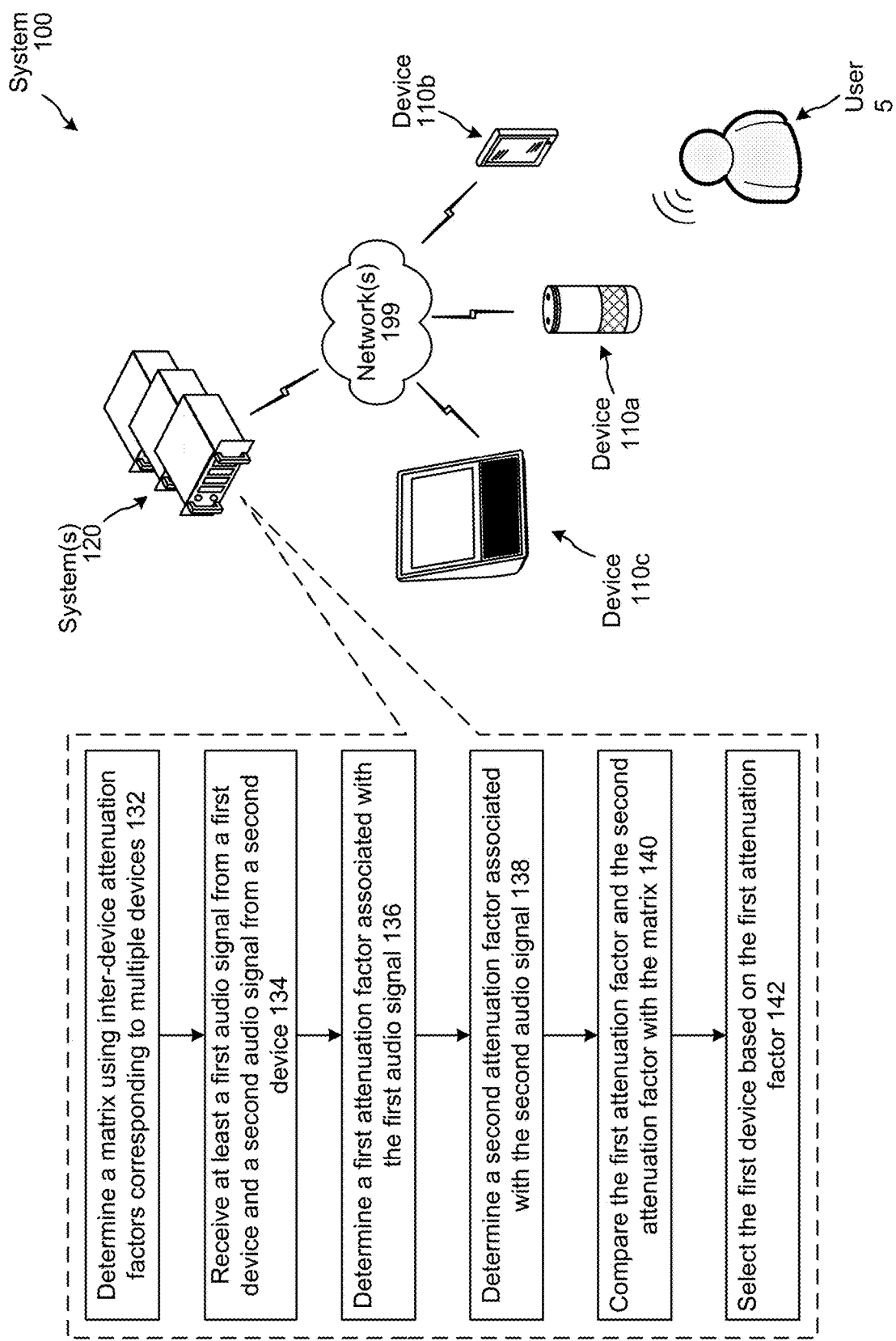
FIG. 1 illustrates a system configured to use acoustic characteristics for device arbitration according to embodiments of the present disclosure.

Electronic devices may be used to capture audio data and generate audio output or other types of output. For example, an electronic device may generate audio using loudspeakers and may capture audio data using one or more microphones. A user may have multiple electronic devices within his/her household. If such devices are located in acoustic proximity to each other (e.g., capable of capturing the same audio), a remote device may receive similar audio data from each of the electronic devices. The remote device may perform arbitration decisions to select an audio input from a single device with which to perform further processing, and from which to receive further audio input. The other (non-selected) electronic devices may be instructed to stop capturing and/or sending audio data to the remote device for the particular interaction and/or session.

The present disclosure relates to device arbitration by evaluating audio signals received from multiple devices within a household or other type of physical space, analyzing ratios of the audio signals with respect to reference ratios, and then selecting a device for further processing. Using a ratio of the audio signals may reduce the need for a calibration and/or normalization factor to compare audio signals from multiple devices. The system can compare the ratio of audio signals with data (e.g., characteristic matrix) representing a relative location of the devices in the user's household.

The system can determine a characteristic matrix by processing audio signals to determine inter-device attenuation values. If an audio signal originates at point A and propagates to point B, it will have less energy when it reaches point B. This loss of energy is referred to as attenuation. Attenuation may be dependent on or otherwise related to how far the audio signal must travel from the source to the destination. The attenuation is stronger (that is, the loss of energy is greater and the signal energy perceived by the destination device is lower) when the audio signal has to travel farther. The inter-device attenuation may be the attenuation experienced between a pair of devices. Since attenuation is dependent on the distance an audio signal has to travel, the inter-device attenuation value may represent an acoustic distance between two devices. The characteristic matrix may be a matrix of inter-device attenuation values and microphone gain ratios for each device pair within the user's household, and may correspond to relative locations of the devices. The system described herein can also detect a change in the location of device using the characteristic matrix by processing incoming audio signals.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user voice inputs. For example, for the user input of "Alexa, play music," a system may output music. For further example, for the user voice input of "Alexa, what is the weather," a system may output synthesized speech representing weather information for a geographic location of the user. In a further example, for the user voice input of "Alexa, send a message to John," a system may capture spoken message content and cause same to be output via a device registered to "John."

In some embodiments, the system described herein processes utterances spoken by a user and captured by multiple devices within the user's household, and perform device arbitration to select a device for further processing, such as ASR and NLU processing.

The systems and methods described herein can be used for device arbitration with respect to devices located within a physical space such that two or more of the devices capture audio generated by a source. Such physical spaces may include, but are not limited to, a household (with multiple floors), an office space, an outdoor space (e.g., backyard, parking lot, playground, etc.), a vehicle, a retail establishment (e.g., mall, store, etc.), a hotel, a lobby, and the like.

FIG. 1 illustrates a system configured to use acoustic characteristics for device arbitration according to embodiments of the present disclosure. As illustrated in FIG. 1, the system may include multiple devices (110a/110b/110c/110d) local to a user 5, and one or more systems 120 connected across one or more networks 199.

A user 5 may have multiple devices 110 set up in his/her home or other locations. When the user 5 speaks, more than one of the devices 110 may receive the audio signal depending on the location of the devices and the location of the user. The acoustic characteristics influences the received audio signal energy at each device. The system 100 is configured to determine the device locations within the home and relative to each other using acoustic characteristics.

If an audio signal originates at point A and propagates to point B, it will have less energy when it reaches point B. This loss of energy is referred to as attenuation. Attenuation may be related to or dependent on how far the audio signal must travel to reach point B. The attenuation is stronger (that is, the loss of energy is greater and the received signal energy is lower) when the audio signal has to travel farther. The attenuation may also be dependent on the number of propagation paths between the signal source, point A, and the signal destination, point B. In an environment where a direct pathway without any potential reflective surfaces (e.g., an echo-free chamber) is available, the signal energy at point B may be significantly lower compared to an environment that includes surfaces that the audio signal can efficiently reflect off to arrive point B. In addition to attenuation, the signal energy measured or realized by the destination source may also depend on its microphone gain.

An audio signal originating close to a particular device (e.g., 110a) may be received by the device 110a and other devices (e.g., device 110b, device 110c, and device 110d (not shown)) within "earshot" of the device 110a. The system 100 may determine a ratio of the audio signal energies received at various devices. For example, the determined ratios may include a first ratio between the signal energies received by the device 110a and the device 110b, a second ratio between the signal energies received by the device 110a and the device 110c, and so on. The system 100 may also determine a ratio of the microphone gains associated with each of the devices 110. Using the signal energy ratios and the microphone gain ratios, the system 100 may determine a characteristic matrix representing device locations relative to one another.

Performing device arbitration using the characteristic matrix can result in the system selecting the device that the user is closest to and/or the device the user is directing the utterance to. For example, the user may be close to a first device but may have his/her back facing the first device and his/her head facing a second device when speaking an utterance. In some cases, the system 120 may select the second device during arbitration. The direction the user is facing will have a stronger sound pressure level than the direction behind him. Because of that, the second device that is in front of the user will perceive a higher energy signal/ lower attenuation compared to the first device that is behind the user.

The system(s) 120 may determine a matrix (e.g., a characteristic matrix) using inter-device attenuation factors corresponding to multiple devices 110 located within the user's household. The characteristic matrix may include a ratio of attenuation values for each device pair. For example, the characteristic matrix may include the ratios A1/A1, A2/A1, A3/A1, A1/A2, A2/A2, A3/A2, and so on, where A1 is the attenuation value experienced by a first device (e.g., device 110a), A2 is the attenuation value experienced by a second device (e.g., device 110b, and A3 is the attenuation value experienced by a third device (e.g., device 110c). The characteristic matrix, using acoustic characteristics defined by the attenuation values experienced by the devices in the user's household, can correspond to an approximate location of a device with respect to another device. As described above, the attenuation value associated with a received audio signal depends on the path of the audio signal from the source to the destination. Details of how the system generates the characteristic matrix are described below in connection with FIGS. 3 and 4.

The system(s) 120 may determine (132) the characteristic matrix during a first time period prior to performing device arbitration on input audio signals using the methods described herein. The system(s) 120 may store the characteristic matrix and associate it with the user profile associated with user 5. In some cases where the user's household includes multiple users that interact with the devices 110, the system(s) 120 may associate the characteristic matrix with multiple user profiles associated with the users in the household. The characteristic matrix is associated with a device layout within a household, and is not dependent on a specific user within the household.

During a second time period, the system(s) 120 may receive (134) at least a first audio signal from a first device (e.g., device 110a) and a second audio signal from a second device (e.g., device 110b). The first and second audio signals may correspond to an utterance spoken by user 5 that was heard/captured by at least the first and second device. The system 100 may determine that the first and second audio signals correspond to the same utterance based on the audio signals being associated with the same user profile and/or the audio signals being received within a certain time period. In some embodiments, the system(s) 120 may receive a third audio signal from a third device (e.g., device 110c) if the third device also captured an audio signal corresponding to the utterance.

The system(s) 120 may determine (136) a first attenuation factor associated with the first audio signal. As described above, the first device experiences some signal loss, represented by the attenuation factor, when it receives an audio signal from a source. The first audio signal perceived by the first device 110a is a product of the attenuation factor and the microphone gain associated with the first device 110a. The system(s) 120 may determine the first attenuation factor using the first audio signal and the microphone gain associated with the first device 110a. The first attenuation factor corresponds to the location of user 5 and the location of the first device 110a, since it depends on the path taken by the first audio signal from the user 5 to the first device 110a.

Figure 5:
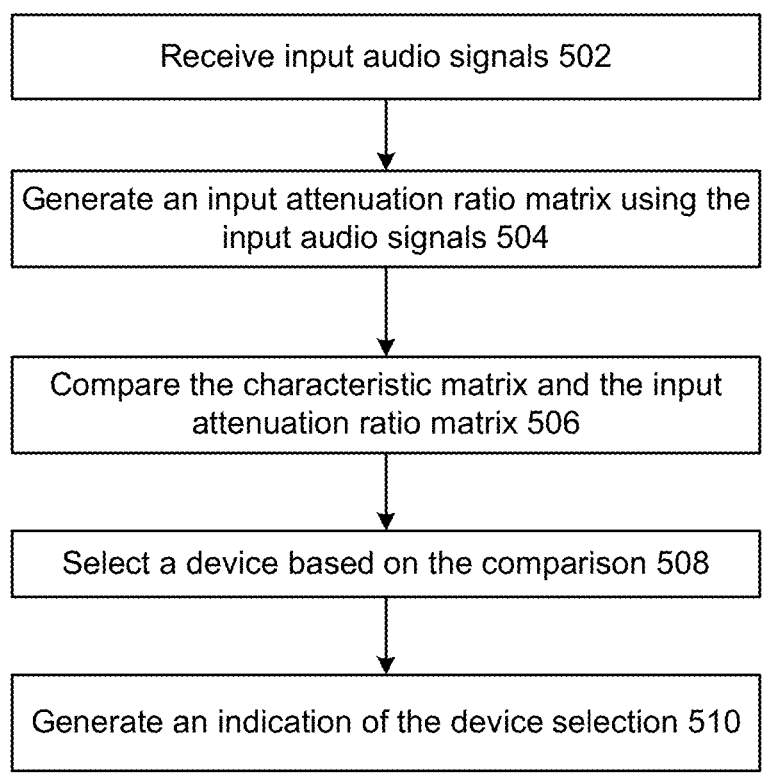
FIG. 5 is a flow diagram illustrating how a system may use the characteristic matrix for device arbitration according to embodiments of the present disclosure.

The system(s) 120 may determine (138) a second attenuation factor associated with the second audio signal. The second audio signal perceived by the second device 110b is a product of the attenuation factor and the microphone gain associated with the second device 110b. The system(s) 120 may determine the second attenuation factor using the second audio signal and the microphone gain associated with the second device 110b. The second attenuation factor corresponds to the location of user 5 and the location of the second device 110b, since it depends on the path taken by the second audio signal from the user 5 to the second device 110b. Further details on how the system determines the attenuation factor for an input audio signal are described below in relation to FIGS. 3 and 5.

The system(s) 120 may store the first and second attenuation factors in a matrix (e.g., an input characteristic matrix) for further processing. The system(s) 120 may compare (140) the first attenuation factor and the second attenuation factor with the characteristic matrix. Further details on how the system compares the attenuation factors corresponding to the input audio signal and the characteristic matrix are described below in relation to FIGS. 3 and 5.

The system(s) 120 may select (142) the first device based on the first attenuation factor. The system(s) 120 may send an indication to the first device 110a that it is selected based on the arbitration performed by the system(s) 120. The first device 110a may continue capturing further audio signals, if any, from the user 5 for the interaction/session and/or for a particular time period. The system(s) 120 may only process further audio signals, if any, received from the first device 110a for the interaction/session with the user 5 and/or for a particular time period. The system(s) 120 may also send output data to the first device 110a for presentation to the user 5.

The system(s) 120 may send an indication to the other devices—at least the second device 110b that it was not selected, and the second device 110b may stop sending further audio signals to the system(s) 120 for at least this interaction/session with the user 5 and/or for a particular time period. The second device 110b may turn off its microphone and may stop capturing further audio signals from the user 5 for at least this interaction/session with the user 5 and/or for a particular time period.

In some embodiments, the system(s) 120 may determine that the location of a device has changed within the user's household. For example, the system(s) 120 may process audio signals from multiple devices, determine the corresponding attenuation factors, and compare the attenuation factors with the characteristic matrix. The system(s) 120 may determine that the attenuation factors do not correspond to the inter-device attenuation factors stored in the matrix, and that may indicate that at least one device's location has changed. The system(s) 120 may update the characteristic matrix to reflect the change in the device location as it affects the inter-device attenuation factors.

The system(s) 120 may analyze the portion of the audio signals corresponding to the wakeword, which may be approximately 200-700 milliseconds of audio. The system(s) 120 is able to perform the functionalities described herein using a small amount of audio data, such as that representing a wakeword spoken by a user, or even a portion of the wakeword.

In an example embodiment, the system(s) 120 may perform a Fast Fourier Transform (FFT) on a portion of an audio signal to transform the signal into the frequency domain. As an example, the system 100 may perform FFT on approximately 10-millisecond intervals of the audio signal corresponding to the duration of the wakeword. In an example embodiment, such processing results in 256 spectral components, which may be grouped into 32 spectral bands (each band being a summation of 8 spectral components). The audio signal energy ratio may represent a ratio of corresponding spectral components from two audio signals. As such, the characteristic matrix may be N×N×32, where N is the number of devices in the user's household.

Figure 2:
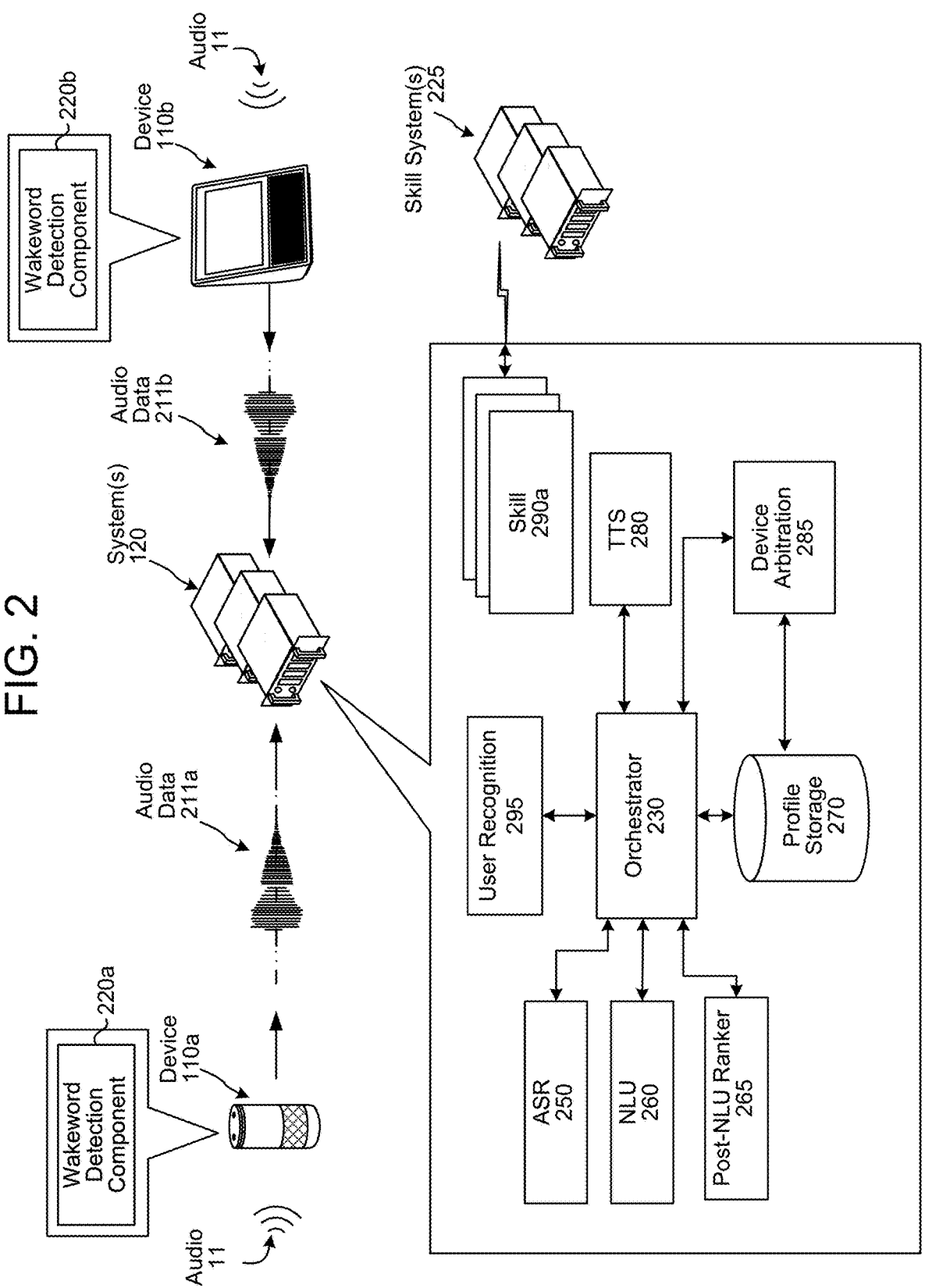
FIG. 2 is a conceptual diagram of components of a system according to embodiments of the present disclosure.

In an example embodiment, one or more of the operations in FIG. 1 may be performed by one or more devices 110. For example, the device 110a, 110b and/or 110c may perform operations 132-142. In another example, the system(s) 120 may perform the operations 132-138, and the device 110a, 110b and/or 110c may perform the operations 140 and 142. In yet another example, the system(s) 120 may perform the operation 132 and the device 110a, 110b and/or 110c may perform the operations 134-142. The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the devices 110a/110b may use a wakeword detection component 220a/220b to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211a, representing the audio 11, to the system(s) 120, and the device 110b may "wake" and begin transmitting audio data 211b, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 225.

Unless expressly stated otherwise, reference to a skill, skill device, skill component, or the like herein may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a post-NLU ranker 265 that receives NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 3:
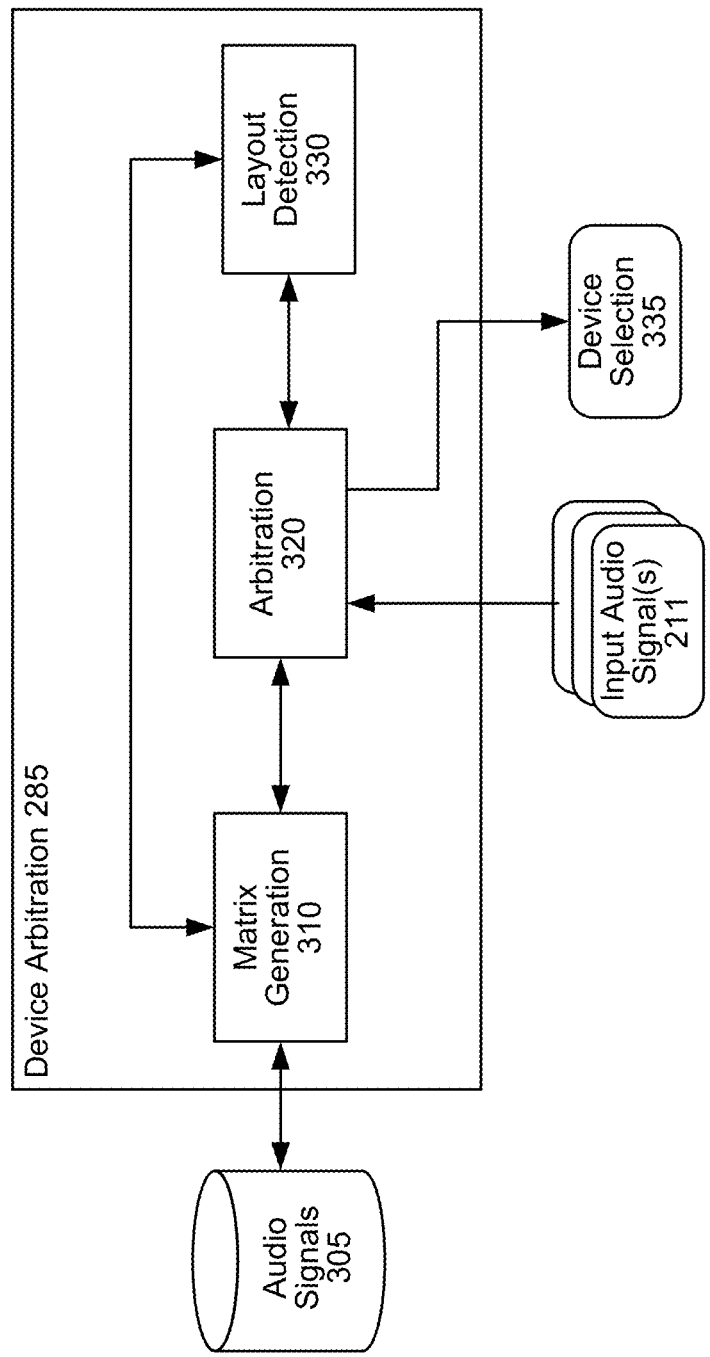
FIG. 3 is a conceptual diagram illustrating components of a device arbitration component according to embodiments of the present disclosure.

The system(s) 120 may include a links action manager component 295, operations of which are described further in connection with FIG. 3. The links action manager component 295 may facilitate determining which skills are registered to perform an action, validate payload data received from a skill to determine whether the action can be performed by another skill, and facilitate other functionalities described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The system(s) 120 may include a device arbitration component 285 that may be configured to generate a characteristic matrix representing relative locations of multiple devices 110 within a user's household, process audio signals from multiple devices 110 and perform device arbitration to select a device 110 for further processing. In some embodiments, the device 110 may include the device arbitration component 285.

FIG. 3 is a conceptual diagram illustrating components of a device arbitration component 285 that the system 100 may use to perform arbitration according to embodiments of the present disclosure. The device arbitration component 285 may include a matrix generation component 310, an arbitration component 320 and a layout detection component 330.

In some embodiments, the device arbitration component 285 may use stored audio signals 305 to generate the characteristic matrix as described below. The audio signals 305 may also be stored in the profile storage 270, and may represent past utterances spoken by the user 5. The input audio signals 211 may be received from multiple devices 110 within the user's household and may represent an input utterance spoken by the user 5. The device selection 335 may be an indication or data indicating which device the device arbitration component 285 selects for further processing.

The matrix generation component 310 may generate a characteristic matrix that is used by the arbitration component 320 to perform device arbitration using the input audio signals 211. The layout detection component 330 may detect a change in the device layout using information from the arbitration component 320 and the characteristic matrix, and may send information to the characteristic matrix to update the values in the characteristic matrix.

The matrix generation component 310 may be configured to determine the characteristic matrix corresponding to a relative location of the devices 110 within the user's household. The matrix generation component 310 may perform one or more functionalities described below.

Audio propagates through air as a pressure wave. The "volume" or perceived loudness of the wave realized by a device is measured as sound pressure level. As audio waves propagate through air, they lose energy; thus, as the destination/receiving device gets further away from the source, the sound pressure level at the receiving device decreases. Microphones have a "gain" characteristic that is a scalar value/number that when multiplied with sound pressure level measured at the microphone, provides the signal output value from the microphone.

When a user speaks, the sound pressure level of associated audio signal is the strongest as it emanates from the user's mouth. As the audio signal propagates through the air and reflects off of surfaces, the utterance reaches the device 110a (D1), for example. The signal (d1) received by device D1 may be calculated as:

$$d1 = s \times A1 \times G1,$$

where s refers to the sound pressure level, A1 refers to the attenuation of the signal received by device D1, and G1 refers to the microphone gain corresponding to device D1.

Depending on the location of other devices, the device 110b (D2) may also receive an audio signal corresponding to the utterance captured by the device 110a. The signal (d2) received by device D2 may be calculated as:

$$d2 = s \times A2 \times G2,$$

where s refers to the sound pressure level, A2 refers to the attenuation of the signal received by device D1, and G2 refers to the microphone gain corresponding to device D2.

In the simplest example, assuming the user is close to D1 when speaking the utterance, the attenuation A1 can be estimated to be 1.0. That is, the signal d1 received by D1 experienced none or negligible energy loss. In this example, then the attenuation A2 represents the acoustic attenuation of the path from the device D1 to the device D2, which may be referred to as the inter-device attenuation corresponding to D1 and D2. Determination of the inter-device attenuation in this example is as follows:

$$d2/d1 = (s \times A2 \times G2)/(s \times A1 \times G1)$$

$$d2/d1 = (A2/A1) \times (G2/G1)$$

Since A is 1.0 in this example, the above simplifies to:

$$d2/d1 = A \times (G2/G1) \qquad \text{Equation 1}$$

The matrix generation component 310 may store the attenuation factor A calculated in the above Equation 1 in a characteristic matrix representing the inter-device attenuation factor from D1 to D2 (e.g., A12).

In some embodiments, the attenuation of the path from the device D2 to the device D1 may be different than the path from the device D1 to the device D2. The system 100 may determine the inter-device attenuation for the path from D1 to D2 (referred to as A12) and may determine the inter-device attenuation for the path from D2 to D1 (referred to as A21). In some embodiments, to determine A21, the system 100 may use an audio signal that originates close to the device D2. That is, the system 100 may use an utterance that the user speaks while close to the device D2, causing the attenuation experienced by D2 to be 1.0 (representing no or negligible energy loss), and resulting in the following calculations:

$$d2/d1 = (A2/A1) \times (G2/G1)$$

Since A2 is 1.0 in this example, the above simplifies to:

$$d2/d1 = A \times (G2/G1) \qquad \text{Equation 2}$$

The matrix generation component 310 may store the attenuation factor A calculated in the above Equation 2 in a characteristic matrix representing the inter-device attenuation factor from D2 to D1 (e.g., A21).

Thus, the matrix generation component 310 may generate the following example characteristic matrix for the above example:

| Characteristic Matrix 1 | | |
|---|---|---|
|  | D1 | D2 |
| D1 | 1.0 | A21 |
| D2 | A12 | 1.0 |

As illustrated in the above characteristic matrix, the inter-device attenuation factor between D1 and D1 is set to 1.0. This represents the concept that if an audio signal originates at D1 (e.g., is generated by D1) and heard by D1, then no signal energy loss is experienced by D1, causing the attenuation to be 1.0.

In other embodiments, the attenuation for the path from D1 to D2 may be the same as the attenuation for the path from D2 to D1. That is, A12=A21. In this case, the system 100 may generate the characteristic matrix accordingly.

The following non-limiting example is presented to illustrate how the matrix generation component 310 may determine the characteristic matrix based on more than two devices. In this example, a user's home may have four devices 110, referred to as D1, D2, D3 and D4. For illustration purposes, assume that the devices are placed in a row, about 20 feet apart, and that received signal energy degrades by 1% per foot. So, a signal energy received at D1 at a level of 100 is received at D2 at a level of 80, is received at D3 at a level of 60, and is received at D4 at a level of 40. Moreover, a signal energy received at D2 at a level of 100 is received by D1 and D3 at a level of 80 (since each is 20 feet apart from D2) and is received by D4 at a level of 60 (since it is 40 feet away from D2).

Using this information, the matrix generation component 310 may generate the following example characteristic matrix for this example:

| Characteristic Matrix 2 | | | | |
|---|---|---|---|---|
|  | D1 | D2 | D3 | D4 |
| D1 | 1.0 | 0.8 | 0.6 | 0.4 |
| D2 | 0.8 | 1.0 | 0.8 | 0.6 |
| D3 | 0.6 | 0.8 | 1.0 | 0.8 |
| D4 | 0.4 | 0.6 | 0.8 | 1.0 |

Thus, in some embodiments, the row and column corresponding to a first device (e.g., D1) in the characteristic matrix represents the case when an audio signal is closest to the first device, and includes attenuation factors experienced by the other devices. In other words, when the audio signal is closest to D1, the attenuation factor corresponding to D2 is 0.8, the attenuation factor corresponding to D3 is 0.6, and so on. In some embodiments, the row corresponding to a device may be referred to as an attenuation vector.

Figure 4:
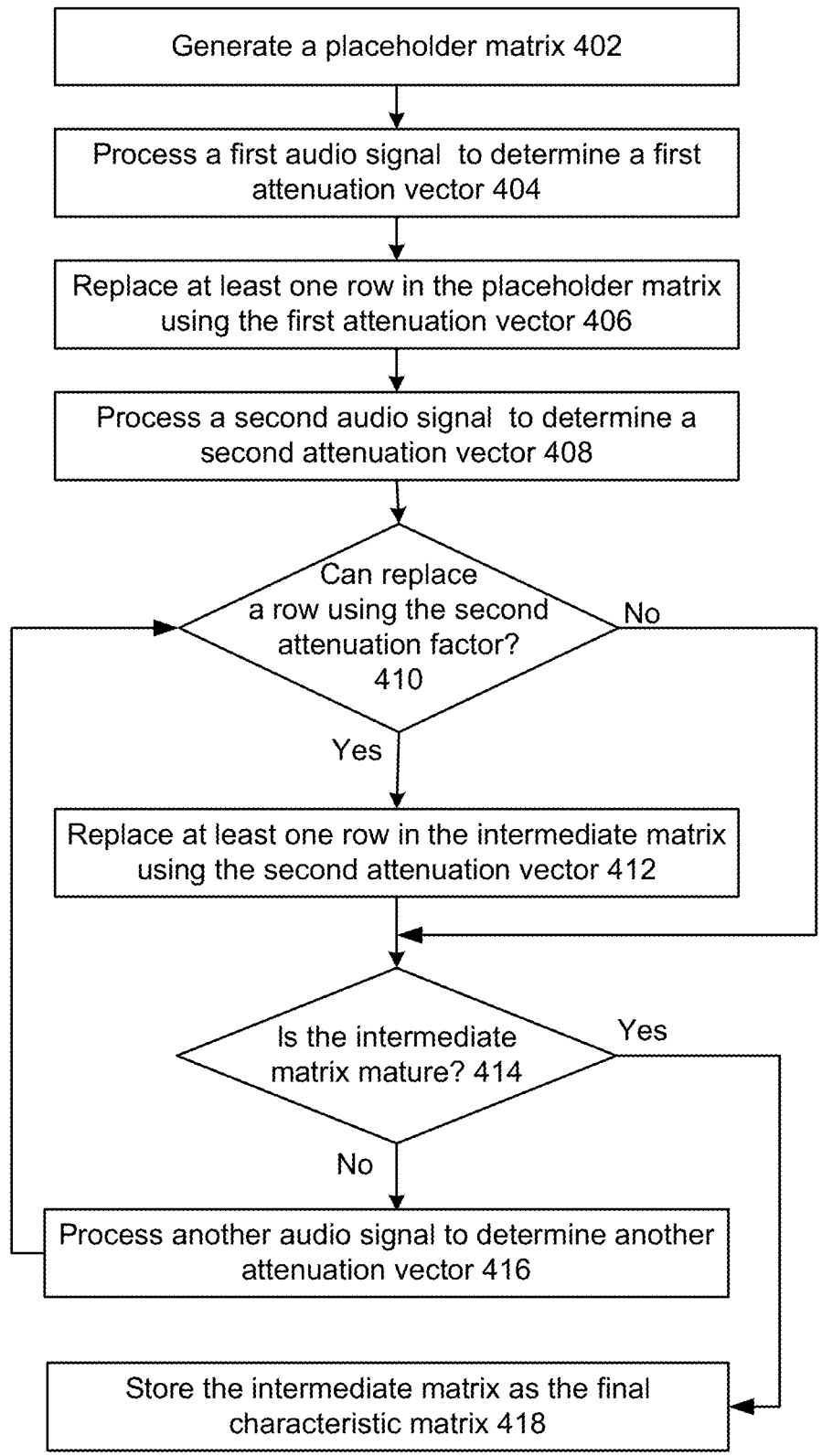
FIG. 4 is a flow diagram illustrating how a system generates a characteristic matrix according to embodiments of the present disclosure.

In some embodiments, the matrix generation component 310 may generate the characteristic matrix corresponding to a user's household using stored audio signals according to the process illustrated in FIG. 4. The stored audio signals may represent past utterances spoken by the user. In some embodiments, the matrix generation component 310 may only use the portion of the audio signal that corresponds to the wakeword. The stored audio signals may be retrieved from the user profile storage 270. In some embodiments, the matrix generation component 310 requests permission, in compliance with data and privacy regulations, from the user to retrieve and process the stored audio signals.

The stored audio signals may represent utterances spoken by the user within his/her household at various locations. The matrix generation component 310 may generate the characteristic matrix by systematically converging on a useful or effective characteristic matrix that most accurately represents the devices' locations relative to one another. In some embodiments, the matrix generation component 310 may cycle through multiple utterances/stored audio signals to determine a set of N utterances, each representing an utterance spoken by the user when he/she was closest to a particular device out of N devices within the user's household. For example, a first utterance of the set of utterances may be spoken when the user was closest to a first device, a second utterance of the set may be spoken when the user was closest to a second device, and so on.

As described above, an utterance/audio signal generated close to a first device results in the attenuation experienced by the other devices as representing the inter-device attenuation between the first device and the other devices. For such utterances, the determined inter-device attenuations can be used to generate the characteristic matrix.

For utterances/audio signals that are not generated close to a device, the matrix generation component 310 computes an energy ratio vector with respect to each device that captured/heard the utterance. The signal energy received by each device is denoted by d (e.g., d1 is received by device D1, d2 is received by device D2, etc.). Of the computed energy ratio vectors, the matrix generation component 310 determines at least one of the vectors that represents values that can be used to generate the characteristic matrix. That is, at least one of the energy ratio vectors corresponds to an audio signal that was generated close to one of the devices. Using the stored audio signals, the matrix generation component 310 determines a final characteristic matrix that corresponds to the devices' locations within the user's household.

To start, the matrix generation component 310 assumes that the devices are located close to one another. The matrix generation component 310 may generate (402) a placeholder matrix of size N×N, where N is the number of devices within the user's household or the number of devices indicated by the user for use with the system 100. The matrix generation component 310 may set all of the values in the placeholder matrix to 1.0. Such a placeholder matrix represents the devices being located close to each other, with no measurable attenuation between each other.

The matrix generation component 310 may then process (404) the stored audio signals to update the values in the placeholder matrix to arrive at the characteristic matrix. For example, the matrix generation component 310 may select a stored audio signal and determine the inter-device attenuation ratios between each pair of devices (e.g., a vector or a matrix). The matrix generation component 310 may determine which device the audio signal was generated close to, and then may replace (406) the values in the placeholder matrix corresponding to that device with the inter-device attenuation ratios corresponding to the selected stored audio signal. The resulting matrix may be stored as an intermediary characteristic matrix. The matrix generation component 310 may then select the next stored audio signal and perform similar steps. The matrix generation component 310 may update (412) the intermediary characteristic matrix with attenuation ratios corresponding to the next stored audio signal.

To determine (410) whether the values in the intermediate characteristic matrix should be replaced with the attenuation ratios corresponding to the instant stored audio signal processed by the matrix generation component 310, the sum total of the inter-device attenuation ratios is considered. The stored audio signal that results in a lower sum total (mass) than the instant intermediary characteristic matrix is used to replace the values in the intermediary characteristic matrix. The lower mass may be caused by a reduction in perceived inter-device attenuation. The perceived inter-device attenuation may reach a minimum when each selected utterance is nearest to each corresponding device. This approach is based on a numerical observation that the sum of factors for any value is minimum when the factors are equal to the square root of the value.

In an example embodiment, the matrix generation component 310 may process (402) a first audio signal corresponding to a first utterance spoken by the user to determine a first attenuation vector representing the attenuation factor experienced by each device in the user's household with respect to the first audio signal. The attenuation vector may include values between 0 and 1, and may be <A1, A2, . . . AN>. A device that does not 'hear' or receive the first audio signal would have an attenuation factor equal to 0.0. The device that is closest to where the first audio signal generated (that is the device the user is standing close to when speaking the utterance) would have the greatest attenuation factor compared to the other devices.

After processing the first audio signal, the matrix generation component 310 may replace (404) a row in the placeholder matrix using the first attenuation vector. The system 100 may determine to replace the row corresponding to the device that has the greatest attenuation factor. For example, if the first attenuation vector is <0.3, 0.8, 0.4, 0.5>, then device D2 has the greatest attenuation factor compared to the other devices. The matrix generation component 310 may use the first attenuation vector to replace the row corresponding to D2 in the placeholder matrix. The matrix generation component 310 may determine the inter-device attenuation factors with respect to D2 and corresponding to the first audio signal, and store those values in the matrix. As described above, the inter-device attenuation factor is the ratio of the attenuation factors of the respective device pair, for example, with respect to D2 the inter-device attenuation factors may be <A1/A2, A2/A2, A3/A2, A4/A2>. Thus, using the first attenuation vector of <0.3, 0.8, 0.4, 0.5>, the system 100 may determine the inter-device attenuation to be: <0.38, 1.0, 0.5, 0.63>. Assuming a placeholder matrix for four devices, after the first audio signal is processed, the placeholder matrix may be updated to generate the following example intermediate characteristic matrix:

|    | D1   | D2  | D3  | D4   |
|----|------|-----|-----|------|
| D1 | 1.0  | 1.0 | 1.0 | 1.0  |
| D2 | 0.38 | 1.0 | 0.5 | 0.63 |
| D3 | 1.0  | 1.0 | 1.0 | 1.0  |
| D4 | 1.0  | 1.0 | 1.0 | 1.0  |

In some embodiments, the system 100 may use the first attenuation vector to replace values in other rows and columns of the placeholder matrix.

The matrix generation component 310 may then process (408) a second stored audio signal corresponding to a second utterance spoken by the user to determine a second attenuation vector representing the attenuation factor experienced by each device in the user's household with respect to the second audio signal. The matrix generation component 310 may replace a row in the intermediate characteristic matrix using the second attenuation vector using the following decision steps.

The matrix generation component 310 may test (410) the second attenuation vector with respect to each row in the intermediate characteristic matrix. The matrix generation component 310 may determine if using the second attenuation vector in the intermediate characteristic matrix decreases the sum total (mass) of a particular test row compared to the stored row values of the matrix. If the sum total of a test row does not decrease, then the matrix generation component 310 determines that the second attenuation vector cannot be used to replace the values in that row. The system 100 then tests another row in the intermediate characteristic matrix. If the sum total does decrease based on the second attenuation vector, then the matrix generation component 310 100 may store an indication that the values in the test row may be replaced using the second attenuation vector. The matrix generation component 310 may test other rows in the matrix, and may store indications of which test rows resulted in a decrease in the sum total. The matrix generation component 310 may then select the test row that results in the greatest decrease in the sum total, and replace the values in that test row based on the second attenuation vector.

For example, the matrix generation component 310 may determine the inter-device attenuation factors with respect to D1 using the second attenuation vector, determine the sum total of the values, and compare it to the sum total of the stored values in the first row corresponding to D1. The matrix generation component 310 may determine that the sum total is not decreased based on the second attenuation vector. The system 100 may then determine the inter-device attenuation factors with respect to D2 using the second attenuation vector, and compare it to the sum total of the stored values in the second row corresponding to D2. The system may determine that the sum total is decreased based on the second attenuation vector, and may store an indication that the row corresponding to D2 results in a sum total decrease and the amount of decrease. The matrix generation component 310 may then test the row corresponding to D3. The matrix generation component 310 may determine the inter-device attenuation factors with respect to D3 using the second attenuation vector, and compare it to the sum total of the stored values in the third row corresponding to D3. The system may determine that the sum total is decreased based on the second attenuation vector, and may store an indication that the row corresponding to D3 results in a sum total decrease and the amount of decrease. After testing the other rows in a similar manner, the system 100 may determine that the decrease in the sum total with respect to the D3 row is greater than the decrease in the sum total with respect to the D2 row. Based on this determination, the matrix generation component 310 may determine to replace the values in the D3 row using the inter-device attenuation factors determined from the second attenuation vector.

After updating the values in the intermediate characteristic matrix, the matrix generation component 310 may continue processing (416) the other stored audio signals as described above. If an attenuation vector corresponding to a stored signal does not decrease the sum total of any of the rows in the intermediate characteristic matrix then the matrix generation component 310 may discard the attenuation vector and other data resulting from the processing and testing the stored audio signal.

In this manner, the system 100 may process stored audio signals corresponding to utterances spoken by the user in the past, and test the attenuation factors corresponding to the stored audio signals to generate the characteristic matrix. The stored audio signals that are selected to replace values in the placeholder matrix or the intermediate characteristic matrix may represent utterances that are spoken closer to one of the devices in the user's household. Starting with a placeholder matrix of 1.0 attenuation values, corresponds to a layout where the devices are located close to each other or at the same location within the household. A decrease in the sum of the attenuation values indicates a layout where the devices are maximally distanced from each other.

In some embodiments, the matrix generation component 310 may determine (414) that the intermediate characteristic matrix represents the final characteristic matrix using values of the off-diagonal pairs. For any matrix element off-diagonal pair, when the values are equal, then they correspond to the value of the attenuation factor between the two devices. That is, when the attenuation ratio for the path from a first device to a second device is the same as the attenuation ratio for the path from the second device to the first device, then the intermediate characteristic matrix may represent the final characteristic matrix. The matrix generation component 310 may store (418) the intermediate characteristic matrix as the final characteristic matrix for use with device arbitration.

In some embodiments, the matrix generation component 310 may determine (414) a maturity metric indicating when the intermediate characteristic matrix is 'matured' to be used as the final characteristic matrix. In an example embodiment, the matrix generation component 310 may determine that the values in the intermediate characteristic matrix substantially accurately represent a device's location relative to other devices. In some embodiments, as the intermediate characteristic matrix approaches maturity, the changes in the sum total become smaller as the matrix generation component 310 processes and tests more stored audio signals. However, a significant decrease in the sum total may occur due to abnormal noise or other factors corresponding to a stored audio signal, causing the matrix generation component 310 to use data corresponding to that audio signal to update the intermediate characteristic matrix. Thus, asymptotic changes in the sum total may be an indication in some embodiments of the characteristic matrix being ready for use.

As described above, the energy signal received/perceived by the device is a product of the attenuation factor and the microphone gain of the device. The energy ratio between two devices is the product of the inter-device attenuation factor and the ratio of the microphone gains of the two devices. The inter-device attenuation factors corresponding to various audio signals are used, as described above, to generate the final characteristic matrix. In some embodiments, the matrix generation component 310 may determine that the intermediate characteristic matrix reached maturity using the microphone gain ratios. As the intermediate characteristic matrix reaches maturity, the microphone gain ratios may stabilize and become fixed values that represent the actual device gain ratio for a device pair.

In some embodiments, the system 100 may generate a gain ratio matrix representing the microphone gain ratios between respective device pairs. The gain ratio matrix may be generated by calculating the square root of the off-diagonal values of the characteristic matrix.

The gain ratio matrix includes $N^2$ elements (N is the number of devices), however, there are only N actual microphone gains. The matrix generation component 310 may use the numerical redundancy in the gain ratio matrix to quantify a maturity metric for the characteristic matrix. For any two devices, there should be only one value for the gain ratio that is accurate. If multiple values are determined for the gain ratio using multiple energy signals that were evaluated to generate the characteristic matrix, then the values should agree if the characteristic matrix is accurate or mature. Since the actual gain ratio for the devices may not be known, the matrix generation component 310 measures the variability in the gain ratio values to determine whether the characteristic matrix is mature. The matrix generation component 310 determines that the actual gain ratio value lies between the range of the 'noisy' values, and that the average of the gain ratio values may represent a more accurate value for the actual gain ratio.

The matrix generation component 310 may use an algorithm to determine the actual gain ratio. The algorithm may be configured to determine the actual gain ratio based on the input values including the actual gain ratio and a random noise value. The algorithm may process the multiple gain ratios and mitigate the random noise value to determine the actual gain ratio. The multiple gain ratios may correspond to different stored audio signals or processed audio signals.

In some embodiments, the matrix generation component 310 may compare the values of a gain ratio of multiple device pairs to determine if the gain ratio for a particular device pair is accurate. For example, the gain ratio matrix includes G1/G2, G2/G3, G1/G3 and G1/G4, where GN represents the gain for the corresponding N device. The matrix generation component 310, using the gain ratio matrix, may determine whether a gain ratio value is accurate or noisy. The matrix generation component 310 may determine a calculated gain value for G3 using the ratios G1/G2 and G2/G3, and may compare the calculated gain value with the observed gain ratios that include G3. When the comparison results in the calculated value being the same as the observed value for G3, the matrix generation component 310 may determine that the characteristic matrix satisfies a maturity metric.

The arbitration component 320 may use the characteristic matrix generated according to the description above can be used to select a device (from multiple devices within a household) to continue capturing input audio signals representing utterances from a user. As described above, multiple devices, depending on their location, may receive audio signals representing an utterance from a user. The arbitration component 320 may receive (502) the multiple audio signals and determine which device should continue to capture further audio signals and/or present an output to the user. The system 100 also may also use this determination (selection of the device) to select the audio signal from the selected device for further processing. Using the characteristic matrix, the arbitration component 320 may determine which device to select, which may result in selecting the device the user is close to and/or the device the user is directing the utterance to.

Continuing with the above non-limiting example corresponding to the characteristic matrix 2 to illustrate how a characteristic matrix can be used to select a device, assume (in a simplest case) a user speaks an utterance while standing close to the device D2. Each of the devices D1-D4 receive an audio signal corresponding to the utterance. The devices D1-D2 may send the received audio signals to a remote system (e.g., system(s) 120) for processing. The arbitration component 320 may generate (504) an input attenuation vector <A1, A2, A3, A4> including values representing the attenuation experienced by each of the devices D1-D4 with respect to the audio signal corresponding to the utterance. For example, the input attenuation vector may be: <0.89, 1.0, 0.79, 0.57>, where the values correspond to D1, D2, D3, D4 respectively. Since the user is standing close to the device D2, the corresponding attenuation value is approximately 1.0 for this example.

The arbitration component 320 may generate (502) an input attenuation ratio matrix representing the attenuation ratios between each of the devices with respect to the input utterance. For example, the arbitration component 320 may generate the following example input attenuation ratio matrix:

|    | D1  | D2  | D3  | D4  |
|----|-----|-----|-----|-----|
| D1 | 1.0 | A21 | A31 | A41 |
| D2 | A12 | 1.0 | A32 | A42 |
| D3 | A13 | A23 | 1.0 | A43 |
| D4 | A14 | A24 | A34 | 1.0 | where A12 represents the ratio between the attenuation (A1) experienced by D1 with respect to the input utterance and the attenuation (A2) experienced by D2 with respect to the input utterance. Thus, A12=A1/A2, and using the above example input attenuation vector, the arbitration component 320 determines:

$$A12=A1/A2=0.89/1.00=0.8$$

Similarly, A34 represents the ratio between the attenuation (A3) of D3 and the attenuation (A4) of D4 (A34=A3/A4) with respect to the input utterance, and the arbitration component 320 determines:

$$A34=A3/A4=0.79/0.57=1.37$$

The values for the same device is set to 1.0 since, for example, the ratio for row D1 and column D1 would be A1/A1 which equals 1.0.

Thus, the arbitration component 320 may determine the input attenuation ratio matrix for the above example as follows:

| Input Attenuation Ratio Matrix 1 | | | | |
|----|-----|-----|-----|-----|
|    | D1  | D2  | D3  | D4  |
| D1 | 1.0 | 1.12 | 0.88 | 0.64 |
| D2 | 0.89 | 1.0 | 0.79 | 0.57 |
| D3 | 1.14 | 1.27 | 1.0 | 0.73 |
| D4 | 1.56 | 1.74 | 1.37 | 1.0 |

The arbitration component 320 then may compare (506) the characteristic matrix and the input attenuation ratio matrix. In some embodiments, the arbitration component 320 determines the magnitude difference (absolute value difference or modulus difference) between the characteristic matrix and the input attenuation ratio matrix. Then the arbitration component 320 determines the sum of the values for each row. The arbitration component 320 may select (508) the device corresponding to the row that results in the lowest sum. This device may represent the device that the user is closest to when speaking the utterance and/or the device the user is directing the utterance to. The arbitration component 320 may generate (510) an indication 335 of the device selected for further processing.

Continuing with the above example, the arbitration component 320 determines:

|characteristic matrix 2−input attenuation ratio matrix 1|=

|    | D1   | D2   | D3   | D4   |
|----|------|------|------|------|
| D1 | 0.0  | 0.32 | 0.28 | 0.24 |
| D2 | 0.09 | 0.0  | 0.01 | 0.03 |
| D3 | 0.54 | 0.47 | 0.0  | 0.07 |
| D4 | 1.16 | 1.14 | 0.57 | 0.0  |

Then the arbitration component 320 determines the sum of the values in each row:

| D1 | 0.84 |
|----|------|
| D2 | 0.13 |

| D3 | 1.08 |
|----|------|
| D4 | 2.87 |

The row corresponding to D2 has the lowest sum, so the arbitration component 320 selects the device D2 to receive further audio signals from and/or to provide an output to the user. Selection of D2, in this example, is accurate because the user was closest to D2 when speaking the utterance.

In this manner the system 100 uses the characteristic matrix for device arbitration and selection for further processing. For example, the system 100 may process audio signals captured by the selected device using ASR and NLU. The system 100 may continue receiving input audio signals from the selected device, and the other devices may stop sending audio signals to the system. The system 100 may, in some embodiments, send output data to the selected device for presentation to the user.

In a non-limiting example, the system 100 may determine a specific output based on the selected device. For example, the utterance spoken by a user may be "Alexa, turn on the lights." The system 100, as described above, may determine which device the user is closest to and/or directing the utterance to. The system 100 may then determine which lights are the closest to the selected device, or which room the selected device is in, and turn on the appropriate lights.

In some embodiments, the characteristic matrix may be used to group two or more devices based on location proximity. For example, the inter-device attenuation factor between devices that are close to one another may be closer to 1.0, and the inter-device attenuation factor between devices that are farther apart may be closer to 0.0. The system 100 may determine that an inter-device attenuation factor for a device pair satisfies a threshold value, and may determine that the devices are located within the same room of the house. The system 100 may also use other information stored in the user profile storage 270 relating to the devices to determine if devices are located in the same room. For example, the system 100 may use the device name provided by the user (e.g., living room device 1, living room device 2, kitchen device, etc.). The system 100 may store association data identifying the grouped devices.

In some embodiments, the device arbitration component 285 may determine an ordered list of devices 110 based on each device's distance from the audio source (e.g., user 5). For example, the device arbitration component 285 may determine that device 110a is closest to the user 5, device 110c is the next closest to the user 5, and device 110b is the farthest from user 5. The device arbitration component 285 may determine the ordered list using the input attenuation ratio matrix and the characteristic matrix, and by performing one or more of the operations described above (e.g., calculating the difference between the input attenuation ratio matrix and the characteristic matrix, and then the sum values in each row of the resulting matrix).

In an example embodiment, the device arbitration component 285 may process some utterances/audio signals to determine a matrix representing relative device locations, and use the matrix to perform device arbitration. In this embodiment, the device arbitration component 285 may not keep processing audio signals to update the matrix until the matrix has matured before using the matrix. Rather, the component 285 may process a number of audio signals (e.g., number corresponding to the number of devices) to determine the inter-device attenuation values for the matrix, and use the matrix to process subsequent incoming audio signals.

Although above examples use numerical values with two decimal places or are estimated to the tenth decimal point, it should be understood that the system can use more or fewer decimal places. The system can be configured to round up or round down and the calculations and determinations can be configured accordingly.

In some embodiments, the layout detection component 330 may detect a change in the layout of the devices within a user's household. After the characteristic matrix is determined to be mature for use, the layout detection component 330 may detect when a device's location has been changed by the user within the household or when the acoustic characteristics of the user's household have changed sufficiently. For example, the acoustic characteristics of the user's household may be affected by relocating furniture or other objects within the house. Such changes may invalidate the characteristic matrix and the layout detection component 330 may be unable to use the characteristic matrix to select a device as described above.

In some embodiments, the layout detection component 330 may detect a power cycle corresponding to a device. A power cycle refers to when a device is turned off or disconnected from a power source, and then the device is turned on. The layout detection component 330 may detect when a device within the user's household is 'offline' or not connected to a power source based on, for example, the layout detection component 330 not receiving any signals or not being able to send signals to the device. When the layout detection component 330 detects the device is 'online' again or connected to a power source, the layout detection component 330 may process the subsequent audio signals received by the devices in the user's household to determine if there is a change in one of the device's location. The layout detection component 330 may process the subsequent audio signals as described above to determine values for the characteristic matrix.

If the device is not connected to a power source again, then the layout detection component 330 may determine that the user's household has one less device, and may update the characteristic matrix and other data to reflect the change in the number of devices. For example, the layout detection component 330 may delete the row and column corresponding to the removed device.

The layout detection component 330 may detect a change in the device location or acoustic characteristics using the gain ratio. Changing the location of the device or other objects in the house may cause the attenuation value experienced by devices change, and may affect the inter-device attenuation ratios used in the characteristic matrix. However, the gain ratios do not change based on a change in the location of the device or other objects in the house. The layout detection component 330 may process an input audio signal corresponding to an utterance heard by the device in the user's household, and may determine that there is change in the inter-device attenuation factors, using the known gain ratios (e.g., gain ratio matrix determined by the system as described above). There may be a step-wise change in the inter-device attenuation factors based on a change in a device location. If the change in the inter-device attenuation factor satisfies a threshold, then the system 100 may determine that the location of a device changed as compared to the location of the device represented in the characteristic matrix.

In some embodiments, the layout detection component 330 may update the values in the characteristic matrix in response to the change in the device location or acoustic characteristics. If the layout detection component 330 determines that device D2 was moved, the layout detection component 330 may update the values in the row and column of the characteristic matrix corresponding to the device D2 using the input audio signal that resulted in the layout detection component 330 determining that the device D2 has been moved. The layout detection component 330 may then process and test one or more subsequent utterances to ensure that the updated inter-device attenuation values in the characteristic matrix accurately reflects the device's D2 new location.

In some embodiments, the change in the device location and/or acoustic characteristics of the house, may cause the layout detection component 330 to discard the characteristic matrix and determine a new characteristic matrix. In this case, the system 100 may generate a new characteristic matrix as described above using audio signals corresponding to utterances spoken by the user after the change in device location or acoustic characteristics is detected by the layout detection component 330.

In some embodiments, the layout detection component 330 may determine if the device was moved to another room based on the inter-device attenuation factor corresponding to a device pair in the updated characteristic matrix satisfying a threshold value. The layout detection component 330 may determine new groups of devices based on their updated location. The layout detection component 330 may store updated association data identifying the newly formed groups, and may also store data identifying that the device was moved from a first room to a second room.

Figure 6:
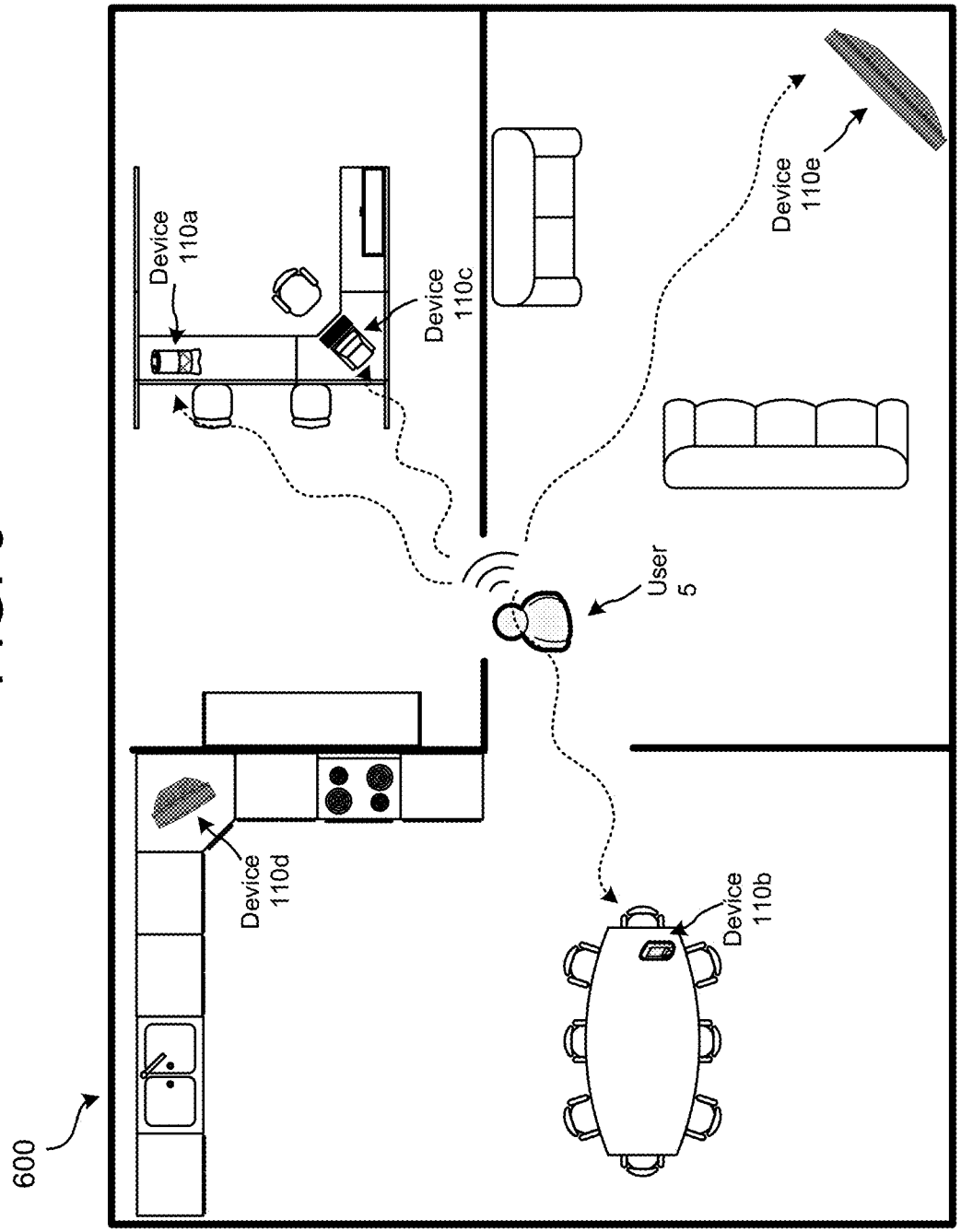
FIG. 6 is a conceptual diagram illustrating a household having multiple devices.
Figure 7:
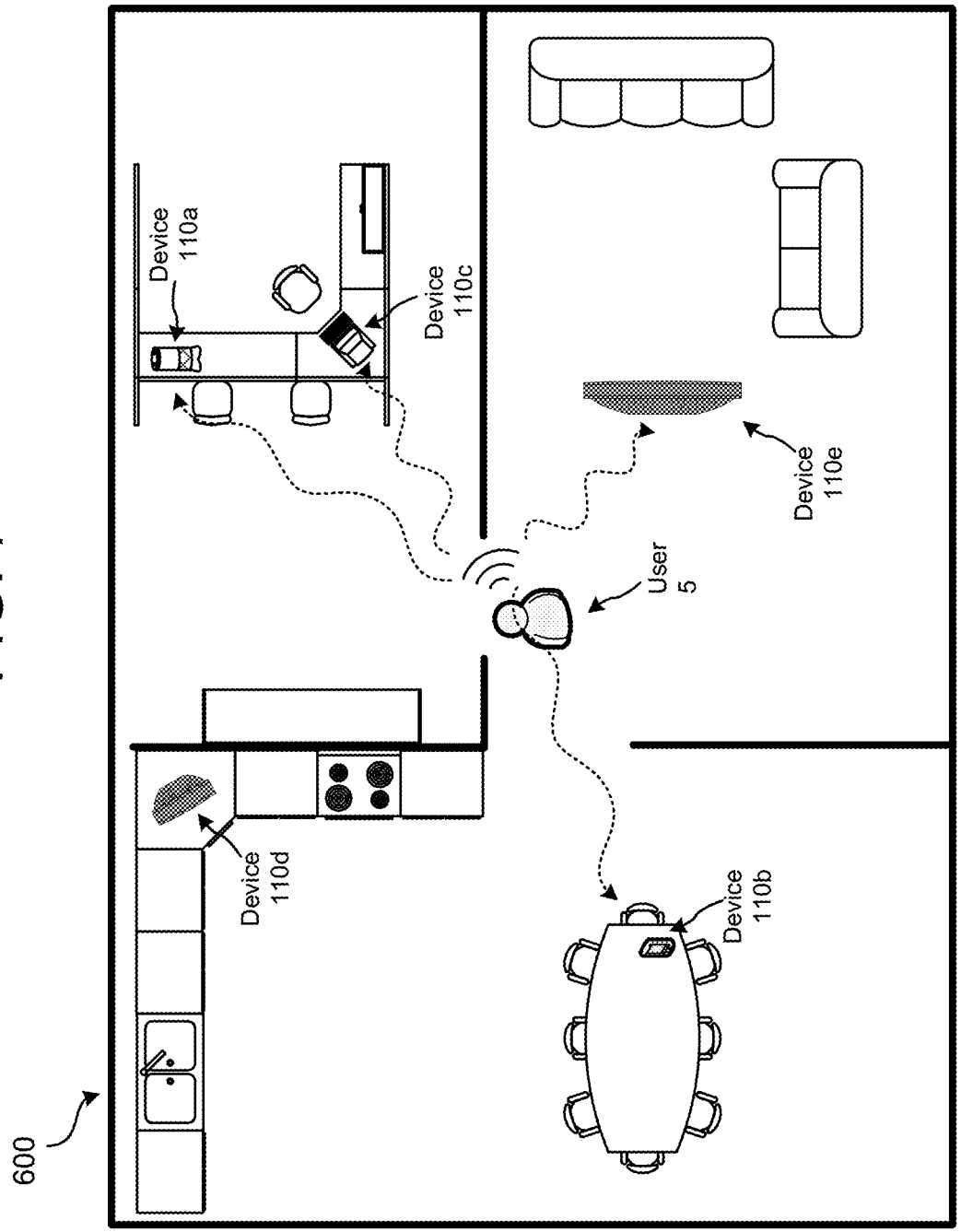
FIG. 7 is a conceptual diagram illustrating the household of FIG. 6 with a change in the device layout.

FIG. 6 is a conceptual diagram illustrating a household 600 having multiple devices 110a-110e. FIG. 7 is a conceptual diagram illustrating the household 600 with a change in the device layout, where the location of the device 110e is changed compared to FIG. 6. The user 5 may speak an utterance that may be received by multiple devices 110a, 110b, 110c, and 110e, as illustrated in FIGS. 6 and 7 by the dotted lines. A change in the location of the device 110e may cause the audio signal from the user 5 to the device 110e to travel less distance as compared to the location of the device 110e in FIG. 6. As described above, such change in location may be detected by the system 100 and cause an update to the characteristic matrix for the household 600.

Figure 8:
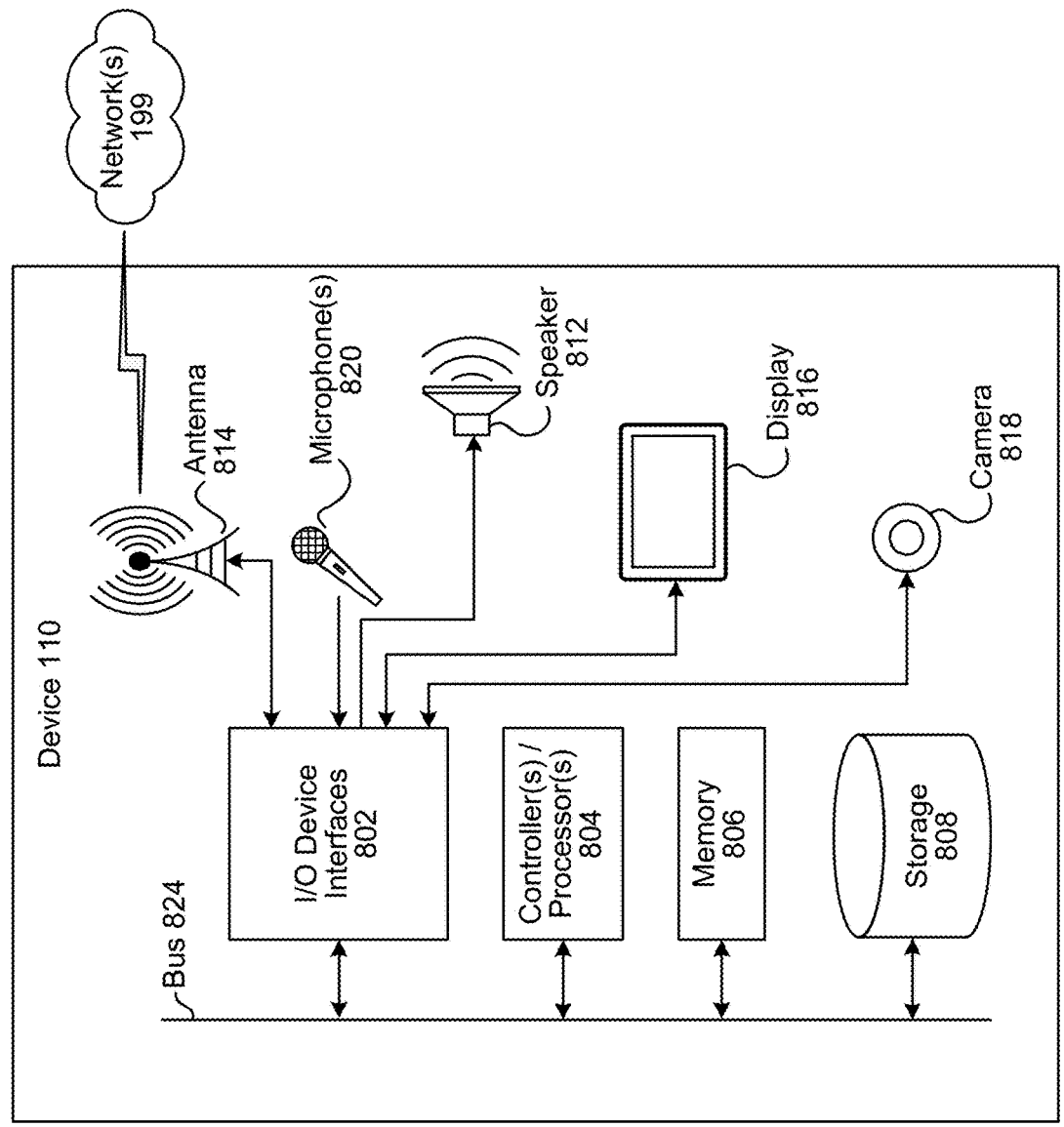
FIG. 8 is a block diagram conceptually illustrating example components of a device according to embodiments of the present disclosure.
Figure 9:
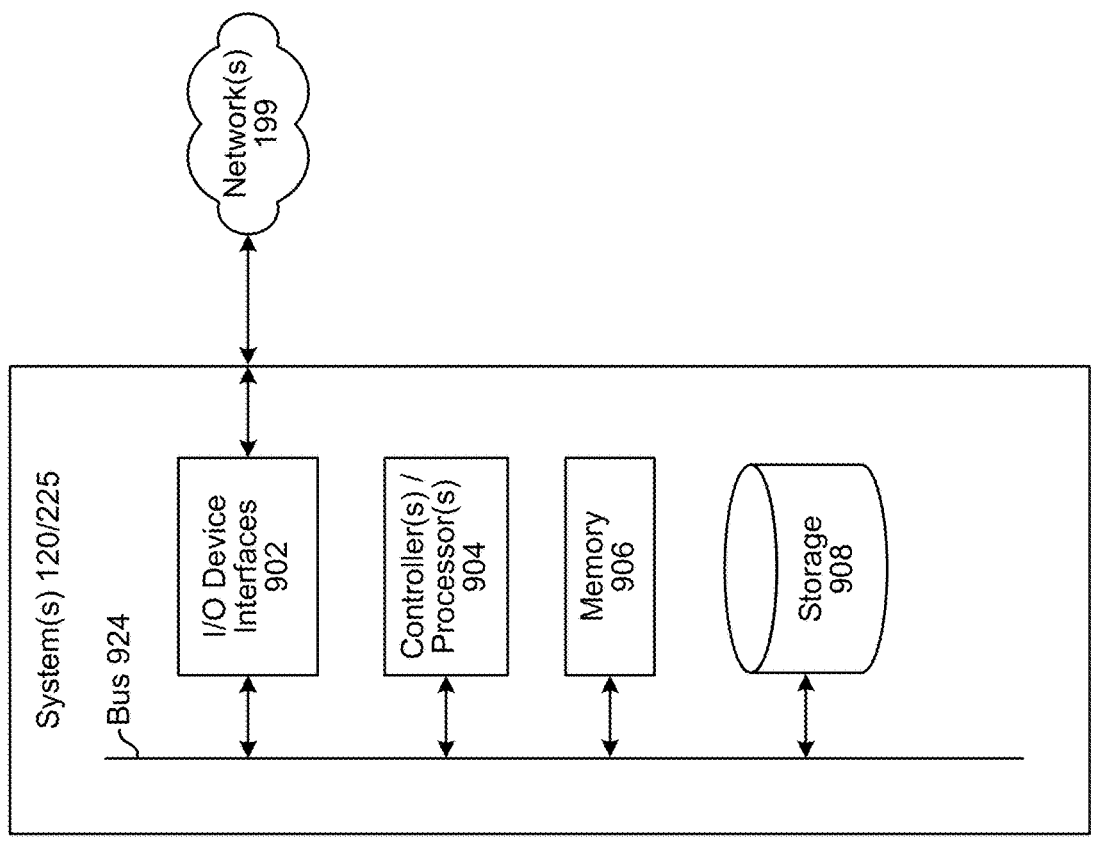
FIG. 9 is a block diagram conceptually illustrating example components of a server according to embodiments of the present disclosure.

FIG. 8 is a block diagram conceptually illustrating a device 110 that may be used with the system. FIG. 9 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (802/902), processor(s) (804/904), memory (806/906), and/or storage (808/908) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 10:
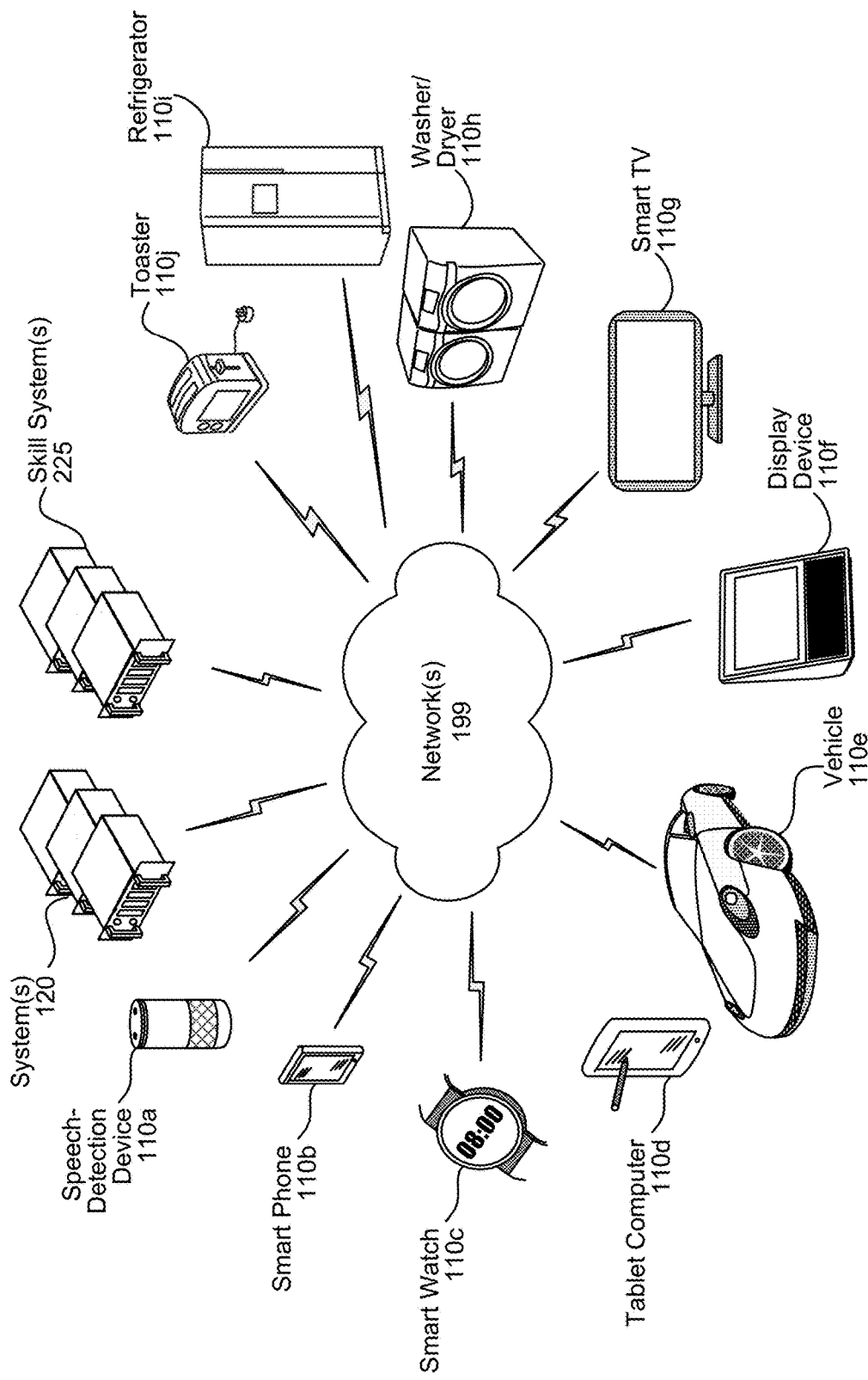
FIG. 10 illustrates an example of a computer network for use with the speech processing system.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    determining first audio data received by a first device, the first audio data corresponding to a first utterance;
    determining second audio data received by a second device, the second audio data corresponding to the first utterance;
    determining a reference inter-device attenuation factor using a first ratio and a second ratio, the first ratio between the first audio data and the second audio data, and the second ratio between a first microphone gain associated with the first device and a second microphone gain associated with the second device;
    generating a matrix using the reference inter-device attenuation factor, the matrix representing an approximate location of the first device with respect to the second device;
    receiving, from the first device, first input audio data corresponding to a second utterance originating from a user location;
    receiving, from the second device, second input audio data corresponding to the second utterance;
    calculating a first attenuation factor associated with the first input audio signal, the first attenuation factor corresponding to the first device and the user location;
    calculating a second attenuation factor associated with the second input audio signal, the second attenuation factor corresponding to the second device and the first user location; and
    selecting the first device from which to receive additional input audio signal using the first attenuation factor, the second attenuation factor and the matrix, the selecting based on the first attenuation factor being within a threshold of the reference inter-device attenuation factor.

2. The computer-implemented method of claim 1, further comprising:
    determining a third ratio between the second microphone gain and a third microphone gain associated with a third device;
    determining a fourth ratio between the first microphone gain and the third microphone gain;
    determining a gain ratio matrix including the second ratio, the third ratio, and the fourth ratio;
    determining a calculated ratio between the first microphone gain and the second microphone gain using the third ratio and the fourth ratio;
    determining that the calculated ratio is within a threshold of the second ratio;
    determining a second reference inter-device attenuation factor using the third ratio and a fifth ratio, the fifth ratio between the second audio data and third audio data received by the third device, the third audio data corresponding to the first utterance;
    determining a third reference inter-device attenuation factor using the fourth ratio and a sixth ratio, the sixth ratio between the first audio data and the third audio data; and
    generating the matrix using the reference inter-device attenuation factor, the second reference inter-device attenuation factor and the third reference inter-device attenuation factor, the generating in response to calculated ratio being within the threshold of the second ratio.

3. The computer-implemented method of claim 1, further comprising:
    receiving, from the first device, third input audio data corresponding to a third utterance;
    receiving, from the second device, fourth input audio data corresponding to the third utterance;
    determining an attenuation ratio using the second ratio and a third ratio between the third input audio data and the fourth input audio data;
    determining that the attenuation ratio is greater than the reference inter-device attenuation factor;
    determining an increased value using a difference between the attenuation ratio and the reference inter-device attenuation;
    determining that the increased value satisfies a condition; and
    determining a second matrix using the third input audio data and the fourth input audio data.

4. A computer-implemented method comprising:
    determining a matrix representing an approximate location of a first device with respect to at least a second device, the matrix determined based at least in part on a first inter-device attenuation factor corresponding to the first device and the second device;
    determining a first attenuation factor associated with first audio data received by the first device, the first audio data corresponding to an utterance;
    determining a second attenuation factor associated with second audio data received by the second device, the second audio data corresponding to the utterance; and
    selecting the first device to receive additional audio data, the selecting based on the first attenuation factor, the second attenuation factor, and the matrix.

5. The computer-implemented method of claim 4, further comprising:
    receiving, from the first device, the first audio data corresponding to a portion of the utterance representing a wakeword,
    wherein the first attenuation factor is determined using a signal energy associated with the first audio data and a microphone gain associated with the first device.

6. The computer-implemented method of claim 4, further comprising:

determining a first stored audio signal received by the first device, the first stored audio signal corresponding to a second utterance;

determining a second stored audio signal received by the second device, the second stored audio signal corresponding to the second utterance; and determining the first inter-device attenuation factor using a first ratio and a second ratio, the first ratio between the first signal energy and the second signal energy, and the second ratio between a first microphone gain associated with the first device and a second microphone gain associated with the second device.

7. The computer-implemented method of claim 6, further comprising:

determining a gain ratio matrix including the second ratio, the fourth ratio, and a fifth ratio between the second microphone gain and the third microphone gain;

determining a calculated ratio between the first microphone gain and the second microphone gain using the fourth ratio and the fifth ratio;

determining that the calculated ratio is within a threshold of the second ratio; and associating the first inter-device attenuation factor and the second inter-device attenuation factor with the matrix.

8. The computer-implemented method of claim 4, further comprising:

receiving, from the first device, fourth audio data corresponding to a second utterance;

receiving, from the second device, fifth audio data corresponding to the second utterance;

determining an attenuation ratio using the second ratio and a fifth ratio between the fourth audio data and the fifth audio data; and determining that the attenuation ratio is different than the first inter-device attenuation factor.

9. The computer-implemented method of claim 8, further comprising:

determining that the attenuation ratio is greater than the first inter-device attenuation factor;

determining an increased value using the attenuation ratio and the first inter-device attenuation factor;

determining that the increased value satisfies a condition; and determining a second matrix using the fourth audio data and the fifth audio data.

10. The computer-implemented method of claim 4, further comprising:

detecting a power cycle event corresponding to the first device;

receiving, from the first device, fourth audio data corresponding to a second utterance;

receiving, from the second device, fifth audio data corresponding to the second utterance;

determining an attenuation ratio using the second ratio and a fifth ratio between the fourth audio data and the fifth audio data;

determining that the attenuation ratio is different than the first inter-device attenuation factor; and associating the attenuation ratio with at least the first device in the matrix.

11. The computer-implemented method of claim 4, further comprising:

determining that the first inter-device attenuation satisfies a condition;

determining that the first device and the second device are located within a room; and storing association data associating the first device and the second device with a device group.

12. The computer-implemented method of claim 4, further comprising:

receiving, from the second device, first audio data associated with an audio signal generated by the first device;

receiving, from a third device, second audio data associated with the first audio signal;

determining the first inter-device attenuation factor using the first audio data and a second microphone gain associated with the second device;

determining a second inter-device attenuation factor using the second audio data and a third microphone gain associated with the third device; and determining the matrix using the first inter-device attenuation factor and the second inter-device attenuation factor.

13. A system comprising:

at least one processor; and at least one memory including instructions that, when executed by the at least one processor, cause the system to:

determine a matrix representing an approximate location of a first device with respect to at least a second device, the matrix determined based at least in part on a first inter-device attenuation factor corresponding to the first device and the second device;

determine a first attenuation factor associated with first audio data received by the first device, the first audio data corresponding to an utterance;

determine a second attenuation factor associated with second audio data received by the second device, the second audio data corresponding to the utterance; and select the first device to receive additional audio data based on the first attenuation factor, the second attenuation factor, and the matrix.

14. The system of claim 13, wherein the instructions that, when executed by the at least one processor, further cause the system to:

receive, from the first device, the first audio data corresponding to a portion of the utterance representing a wakeword, wherein the first attenuation factor is determined using a signal energy associated with the first audio data and a microphone gain associated with the first device.

15. The system of claim 13, wherein the instructions that, when executed by the at least one processor, cause the system to receive the data further causes the system to:

determine a first stored audio signal received by the first device, the first stored audio signal corresponding to a second utterance;

determine a second stored audio signal received by the second device, the second stored audio signal corresponding to the second utterance; and determine the first inter-device attenuation factor using a first ratio and a second ratio, the first ratio between the first signal energy and the second signal energy, and the second ratio between a first microphone gain associated with the first device and a second microphone gain associated with the second device.

16. The system of claim 15, wherein the instructions that, when executed by the at least one processor, cause the system to receive the data further causes the system to:

determine a gain ratio matrix including the second ratio, the fourth ratio, and a fifth ratio between the second microphone gain and the third microphone gain;

determine a calculated ratio between the first microphone gain and the second microphone gain using the fourth ratio and the fifth ratio;

determine that the calculated ratio is within a threshold of the second ratio; and associate the first inter-device attenuation factor and the second inter-device attenuation factor with the matrix.

17. The system of claim 13, wherein the instructions that, when executed by the at least one processor, further cause the system to:

receive, from the first device, fourth audio data corresponding to a second utterance;

receive, from the second device, fifth audio data corresponding to the second utterance;

determine an attenuation ratio using the second ratio and a fifth ratio between the fourth audio data and the fifth audio data; and determine that the attenuation ratio is different than the first inter-device attenuation factor.

18. The system of claim 17, wherein the instructions that, when executed by the at least one processor, further cause the system to:

determine that the attenuation ratio is greater than the first inter-device attenuation factor;

determine an increased value using the attenuation ratio and the first inter-device attenuation factor;

determine that the increased value satisfies a condition; and determine a second matrix using the fourth audio data and the fifth audio data.

19. The system of claim 13, wherein the instructions that, when executed by the at least one processor, further cause the system to:

detect a power cycle event corresponding to the first device;

receive, from the first device, fourth audio data corresponding to a second utterance;

receive, from the second device, fifth audio data corresponding to the second utterance;

determine an attenuation ratio using the second ratio and a fifth ratio between the fourth audio data and the fifth audio data;

determine that the attenuation ratio is different than the first inter-device attenuation factor; and associate the attenuation ratio with at least the first device in the matrix.

20. The system of claim 13, wherein the instructions that, when executed by the at least one processor, further cause the system to:

determine that the first inter-device attenuation satisfies a condition;

determine that the first device and the second device are located within a room; and store association data associating the first device and the second device with a device group.

* * * * *